United States Patent Office 3,336,265
Patented Aug. 15, 1967

3,336,265
NITROGEN-CONTAINING POLYMERIC PRODUCTS, THEIR PREPARATION AND USE
Richard A. Palm, Niederdollendorf (Rhine), Hans H. W. Ohse, Oberdollendorf (Rhine), Harald H. O. Cherdron, Ittenbach (Rhine), and Friedrich W. A. G. K. Korte, Hangelar, Germany, assignors to Shell Oil Company, New York, N.Y., a corporation of Delaware
No Drawing. Filed Sept. 8, 1964, Ser. No. 395,044
Claims priority, application Germany, Oct. 15, 1963, S 87,884
8 Claims. (Cl. 260—78.3)

This invention relates to new nitrogen-containing polymeric products and to their preparation. More particularly, the invention relates to new nitrogen-containing polymers derived from polymers of unsaturated lactones, and to the use of the new products, particularly in the treatment of paper, textiles and the like.

Specifically, the invention provides new and particularly useful nitrogen-containing polymers that can be cross-linked and are soluble in polar solvents, such as water, said polymers comprising the reaction product of an addition polymer of an unsaturated heterocyclic substituted lactone, such as, for example, a polymer of 2-(3',4'-dihydro-2'H-pyran-2'yl)-beta-propiolactone, with a nitrogenous base, such as ammonia.

There is a great need in industry, particularly in the coating, paper and textile fields, for polymeric materials which are soluble in polar solvents, such as water, and which can be subsequently cross-linked to form insoluble products. Such polymers have been difficult to find either because they lack the necessary solubility characteristics or lack the ability to be readily cross-linked.

It is, therefore, an object of the invention to provide a new class of nitrogen-containing polymers. It is a further object to provide a new class of nitrogen-containing polymers that can be cross-linked and are soluble in polar solvents. It is a further object to provide new polymeric products which are soluble or easily dispersible in water and can be converted to insoluble products. It is a further object to provide a new group of polymeric products which are useful for treatment of paper, textiles and the like. It is a further object to provide new soluble polymeric products which are useful as thickeners, emulsifying agents and exchange resins. These and other objects of the invention will be apparent from the following detailed description thereof.

It has now been discovered that these and other objects may be accomplished by the new nitrogen-containing polymers of the present invention comprising the reaction product of an addition polymer of an unsaturated heterocyclic substituted lactone, such as, for example, a polymer of 2-(3',4'-dihydro-2'H-pyran-2'yl)-beta-propiolactone, with a nitrogenous base, such as, for example, ammonia. These new polymeric products have been found to possess many new and valuable properties which make them useful in industry. It has been found, for example, that despite the fact that the starting lactone polymers are insoluble in water, the new derivatives are soluble in polar solvents, such as water. Particularly surprising is the fact that even a polymer conversion with only 50 to 75% of the equimolecular amount of nitrogenous base is sufficient to insure a solubility of up to 50% of the weight in water. In this case, the polymers are not decomposed but retain their fundamental structure. They contain the lactone groups in the molecule along with the lactone group modified with the nitrogen-containing reactant so as to form amide and/or amine salt groups.

It has been further found that when the above-noted lactone polymers or those partly modified with the nitrogenous bases are reacted with polyamines, the polymeric product is cross-linked in a very short time to form water-insoluble products. In addition, they become partly infusible in that they decompose at temperatures above about 250° C.

The polymers to be used in making the new polymeric products of the present invention include the addition polymers of the unsaturated heterocyclic-substituted lactones. These preferred unsaturated lactones are those having a propiolactone group substituted with a cyclic structure containing an ethylenic group adjacent to a heteroatom. By "heteroatom" is meant a polyvalent atom other than carbon, such as, for example, oxygen, nitrogen, sulfur, phosphorus, arsenic, antimony, tin, lead, silicon, and the like. Cyclic groups which contain both the heteroatom and the ethylenic group include, among others, the dihydropyranyl, tetrahydropyridine, thiophene, pyrrole, furan, and the like, and their substituted derivatives such as, for example, their halogenated, alkylated, alkoxy substituted derivatives and the like. A preferred group of these compounds may be illustrated by the following general formula

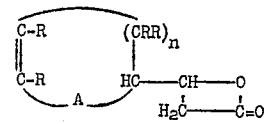

wherein R is a hydrogen, halogen or hydrocarbon radical, A is oxygen, nitrogen or sulfur and $n$ is 1 to 2.

A particularly preferred group of the compounds include those of the general formula

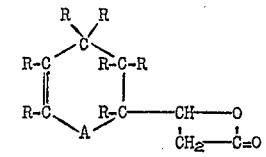

wherein R is hydrogen, halogen, or an alkyl radical, and A is oxygen or sulfur.

Representative examples of these compounds include
2-(3',4'-dihydro-2'-H-pyran-2'yl)-beta-propiolactone,
2-(3',4'-dibutyl-3',4'-dihydro-2'-H-pyran-2'yl)-beta-propiolactone,
2-(3'-chloro-3',4'-dihydro-2'H-pyran-2'yl)-beta-propiolactone,
2-(4'-octyl-3',4'-dihydro-2'H-pyran-2'yl)-beta-propiolactone,
2-(2',3',4'-trichloro-3',4'-dihydro-2'H-pyran-2'yl)-beta-propiolactione,
2-(4'-allyl-3',4'-dihydro-2'H-pyran-2'yl)-beta-propiolactone,
2-(4'-cyclohexyl-3',4'-dihydro-2'H-pyran-2'yl)-beta-propiolactone,
2-(2',3'-dihydro-thiophen-2'yl)-beta-propiolactone,
2-(2',3'-dihydrofuran-2'yl)-beta-propiolactone.

The unsaturated heterocyclic-substituted propiolactones may be prepared by a variety of different ways. They may be prepared, for example, by reacting the corresponding unsaturated heterocyclic-substituted aldehyde with ketene, preferably at a temperature below 20° C. Detailed description of this type of reaction may be found in U.S. 2,478,388 and U.S. 2,518,662.

Temperatures below 20° C., in particular below —10° C., may be suitably used for the purpose. The optimum temperature range depends on the catalyst used. If, for example, boron trifluoride etherate is used as catalyst, the preferred temperature is below —50° C. If other catalysts of the Friedel-Crafts type are employed, such as, for example, zinc chloride, aluminum chloride or iron tri-chloride, the reaction temperatures selected may advantageously be above −50° C. Suitable solvents for the preparation of the lactones are, for example, diethylether, di-isopropyl ether, dioxane and carbon tetrachloride. The use of methylene chloride as a solvent may facilitate the separation of the catalyst and lead to good yields, as there will be less premature polymerization during the final distillation of the unsaturated lactones. As long as the distilling temperature remains below 150° C., there is practically no decomposition of the lactones as a result of decarboxylation.

The polymers of the above-described lactones used in the process of the invention comprise the addition polymers, i.e., those formed by polymerization through the double bond. The polymerization is accomplished by contacting the unsaturated lactones with an ionic, and preferably a cationic polymerization initiator. Surprisingly, the lactone ring is not split in this process but remains intact in the resulting polymer.

Suitable cationic initiators are, for example, boron trifluoride, acetyl perchlorate, aluminum chloride, zinc chloride, titanium tetrachloride, iron trichloride and trifluoro acetic acid, as well as their complexes such as, for example, the complex of iron trichloride and propylene oxide or of boron trifluoride and diethylether. Preferred initiators are acetyl perchlorate, boron trifluoride, titanium tetrachloride and zinc chloride. Suitable anionic initiators are organo-metallic compounds, in particular organic aluminum compounds such as, for example, diethyl aluminum monochloride and ethyl aluminum dichloride.

The initiator concentration required depends on the initiator and generally is between 0.001 and 5 mol percent, in particular between 0.05 and 2 mol percent, based on the monomers. It has been found that with low monomer concentrations, e.g., 20%, the polymerization tends to die out after some time, for example, after 5–15 hours. By adding further amounts of initiator the polymerization may be reactivated and the conversion increased. This is not necessary with monomer concentrations of 50% and higher.

The polymerization can be conducted in bulk, i.e., with the straight monomer or in the presence of solvent, such as, methylene chloride and the like.

It has been found also that higher conversions may be achieved with lower polymerization temperatures, especially with temperatures below −20° C. According to the invention the new lactones may be copolymerized with monomers containing a $>C=C<$ group, such as, for example, styrene, alpha-methyl styrene, isobutylene, vinylacetate, acrylonitrile and methyl methacrylate. Other monomers include dichlorostyrene, ethylene, propylene, vinyl naphthalene, acrylic acid, methacrylic acid, butyl acrylate, ethyl acrylate, vinyl phenol, vinylidene chloride, vinyl chloride, vinyl ketone, methacrylonitrile, vinyl ethers, such as vinyl ethyl ether, vinyl butyl ether, allyl butyl ether, diallyl phthalate, divinyl succinate, acrylamide, allyl butyl ether, diallyl phthalate, divinyl succinate, acrylamide, allyl glycidyl ether and the like, and mixtures thereof.

The polymers may be recovered by any suitable method as by precipitation. In some cases, it may be desirable to leave the polymer in the reaction medium for further reaction with the nitrogenous bases.

The polymers prepared by the above-described method are liquids to solids of generally low molecular weight (e.g., up to about 10,000 as determined ebullioscopically in toluene). They are soluble in certain organic solvents, such as chlorinated hydrocarbons, tetrahydrofuran and the like, but insoluble in water.

The preparation of one of the unsaturated lactones and polymers thereof is illustrated below:

2-(3',4'-dihydro - 2'H - pyran-2'yl)-beta-propiolactone and polymers thereof.—392 g. (3.5 mol) of 3.4-dihydro-2H-pyran-2-carboxaldehyde were dissolved in 2.0 liters of anhydrous methylene chloride distilled over $P_2O_5$. After cooling to −70° C., 168 g. (4 mol) of ketene were condensed into the solution. 10 ml. of $BF_3$-etherate in 70 ml. of methylene chloride were subsequently added dropwise with vigorous stirring and in such a manner that the temperature of the mixture did not exceed −65° C. At first, the reaction was strongly exothermic, but at the end of the dropwise $BF_3$-addition, which took approximately 3½ hours, only a slight temperature rise was still observed. Stirring was continued at −70° C. for one more hour, after which 20 ml. of triethylamine in 50 ml. of $CH_2Cl_2$ were added dropwise. After removal of the cold batch the reaction mixture was mixed with 150 ml. of water at about −30° C. The temperature of the mixture was then raised to 0° C. so that the water became liquid, after which the mixture was rapidly cooled to about −40° C. and the ice containing the $BF_3$-triethylamine complex was immediately removed by suction. The mixture was subsequently washed with cooled methylene chloride and the filtrate dried with calcined magnesium sulphate. After 2–3 hours the mixture was filtered, and distilled after the solvent had been removed. The crude product was a yellow to reddish brown, fairly viscous liquid, which was obtained in a yield of 90–95%, based on carboxaldehyde. Distillation gave 355 g. of 2-(3',4'-dihydro-2'H-pyran-2'yl)-beta-propiolactone (yield 66%). To obtain a completely purified product the above product was then again distilled in the presence of 1% of toluene diisocyanate.

Boiling range: 85–87° C./0.02 mm., $n_D^{20}=1.4828$, $d_4^{20}=1.1764$.

HOMOPOLYMER 2 ml. of 2-(3',4'-dihydro-2'H-pyran-2'yl)-beta-propiolactone prepared above were polymerized at room temperature in the presence of various cationic initiators. At the end of the polymerization the polymer was dissolved in $CH_2Cl_2$ or acetone and subsequently precipitated by adding 6 to 8 times the amount of ether.

The results are shown in the following table:

| Exp. | Initiator | Mol of Initiator per mol of monomer | Solvent [1] | Time, hrs. | Conversion, percent | $\eta$ [2] |
|---|---|---|---|---|---|---|
| 2 | $BF_3$-etherate | $1.10^{-3}$ | $CH_2Cl_2$ | 24 | 98 | 0.04 |
| 3 | $ZnCl_2$ | $1.10^{-2}$ |  | 67 | 60.5 | 0.05 |
| 4 | $TiCl_4$ | $5.10^{-3}$ |  | 67 | 57 | 0.05 |
| 5 | $CH_3C(O)ClO_4$ | $1.10^{-3}$ | $C_6H_5CH_3$ | 24 | 80 | 0.04 |
| 6 | $BF_3$-etherate | $1.10^{-3}+1.10^{-3}$ | $CH_2Cl_2$ | 15+7 | 72 | 0.04 |
| 7 | $BF_3$-etherate | $1.10^{-3}$ | $(C_2H_5)_2O$ | 23 | 47.5 |  |

[1] 20% 2-(3',4'-dihydro-2'H-pyran-2'yl)-beta-propriolactone.
[2] In a 1% acetone solution at 20° C.

The viscosity numbers correspond to molecular weight of between 2,000 and 5,000. The products have a melting range of from 180–200° C., were soluble in methylene chloride, acetone, tetrahydrofuran, dioxane and dimethylformamide, insoluble in methanol, ether, petroleum ether and water. The infrared spectrum showed a distinct band at 1820 cm.$^{-1}$ belonging to a beta-lactone grouping.

COPOLYMER 2-(3',4'-dihydro - 2'H - pyran-2'yl)-beta-propiolactone and styrene and an equal amount of methylene chloride were pipetted into a thoroughly dried flask with ground top which had been purged with nitrogen. Equimolar amounts of silver perchlorate and acetyl chloride were added, whereupon silver chloride precipitated spontaneously and polymerization started. The polymerization temperature was —20° C. After 18 hours the polymerization was stopped by dissolving the mixture in methylene chloride and the polymerizate was precipitated in methanol. Styrene components and beta-lactone components were clearly identifiable in the infra-red spectrum. Solution differences and titrations in combination with decarboxylation experiments showed that a genuine copolymer was obtained instead of a physical mixture.

The above-described addition polymers which include homopolymers, copolymers and terpolymers, of the unsaturated lactones are reacted with the nitrogenous bases to form the desired products of the invention. The nitrogenous bases to be used in the reaction are the basic nitrogen-containing compounds, and particularly those having a dissociation constant greater than $2.0 \times 10^{-5}$. Examples of the nitrogenous bases include, among others, hydrazine, ammonia, ethyl amine, methylamine, isopropylamine, diethylamine, dimethylamine, diisopropylamine, ethanolamine, hexamethylene diamine, aniline, cyclohexylamine, allylamine, cyclopentylamine, cyclohexenylamine, amylamine, ethylene diamine, 2,3-diaminopyridine, 3,4-diaminobenzoic acid, p-phenylene diamine, diethylene triamine, pentamethylenediamine, and the like. Preferred nitrogenous bases include hydrazine, ammonia, water-soluble mono-amines, such as primary and secondary aliphatic amines, and particularly those containing another group in addition to the amine group, such as, for example, an OH group.

When diamines are used, the polymer in solution is cross-linked within a fairly or a very short time, thereby becoming water-insoluble. Polyamines, such as urotropin, may also be used. They show less tendency to cross-linking. The use of aromatic and cycloaliphatic or heterocyclic amines greatly increases the solubility of the polymers in polar solvents, although complete water solubility is not always achieved. The reaction with nitrogenous bases is preferably carried out in an aqueous solvent in which the polymer may be suspended. Concentrations vary from about .1% to about 15%.

It is preferred not to use an equimolecular amount of the nitrogenous base, but only such a quantity that the polymer dissolves in water. In this case, a portion of the beta-lactone groups of the polymer is retained, while another portion obviously renders the polymer soluble by ring opening and formation of amides or amine salts. This is surprising, since, for example, the polymers of the 2-(3',4'-dihydropyran-2'yl)-beta-propiolactone are themselves completely water-insoluble, although they contain intact beta-lactone groups which per se may be considered as hydrophilic and solubilizing groups. Particularly surprising is the fact that even a polymer conversion with only 50 to 75% of the equimolecular amount of nitrogenous base is sufficient to ensure a solubility of up to 50% of the weight in water. In this case the polymers are not decomposed but retain their fundamental structure. They contain the beta-lactone groups in the molecule with only a partly modified structure. The polymers partly converted with nitrogenous bases can react further with polyamines, the molecules being cross-linked till the polymers are water-insoluble. The products cross-linked in such a way generally have a higher softening point than the polymeric 2-(3',4'-dihydropyran-2'yl)-beta-propiolactone. They are partly infusible and only decompose at temperatures above 250° C.

Particularly superior results are obtained when sufficient nitrogenous base is employed to convert up to 75% of the lactone group to the amide and/or amine salt groups and still more preferably from 10% to 75% to such groups.

The reaction between the lactone polymer and the nitrogenous base may be accomplished by merely mixing the two components together at ambient temperature. However, slightly elevated temperatures, e.g., temperatures of 30° C. to 95° C. are preferred. Temperatures up to about 150° C. may be used, however, to shorten the reaction time. When polyamines are used, cross-linking is accelerated by using higher temperatures.

The new nitrogen-containing products of the invention will generally vary from thick liquids to hard solids which preferably have melting points above 150° C. They will have improved solubility in polar solvents, e.g., water, methanol, acetic acid, formamide, dimethyl sulphoxide and pyridine. The degree of the solubility will depend on the extent of reaction with the lactones as noted above. The preferred products will have at least 25% of their lactone groups remaining intact and can be further reacted through that group.

The cross-linked products are solids of higher melting points, e.g., temperatures above 250° C., and have lost a great part of their solubility in water and the like.

Owing to their solubility, in particular in water, and their capacity for being cross-linked to form hard, high-melting or in fusible resins, the novel polymers which can be prepared according to the invention possess particularly favorable properties, which make them suitable for a wide range of applications. They may advantageously be worked up into water-soluble coating and paint-compositions, they improve the strength of paper and textiles and may find application as exchange resins or emulsifiers as well as thickeners.

*Example I*

This example illustrates the preparation of a reaction product of a homopolymer of 2-(3',4'-dihydropyran-2'yl) beta-propiolactone and diethylamine, and the use on paper.

A quantity of 1 part (0.0065 mol) of the homopolymer of 2-(3',4' - dihydropyran - 2'yl) - beta-propiolactone prepared as shown above was suspended in 20 parts of water and stirred in a water bath with 0.355 part (0.0049 mol) of diethylamine (75% of the equimolecular amount) at 50° C. After 30 minutes the polymer had dissolved. Stirring was continued until after 2–4 hours the solution showed a neutral reaction. The product was evaporated to dryness in vacuo. Yield 1.3 parts of a polymer containing 5.6% by weight of nitrogen, 60.8% by weight of carbon and 6.2% by weight of hydrogen, melting at 206–230° C. and having a solubility in water of 48%.

A 5% aqueous solution of the above polymer is used to impregnate paper and then dried. The resulting product had improved durability and strength.

*Example II*

A quantity of 2 parts (0.013 mol) of polymeric 2-(3',4' - dihydropyran - 2'yl)-beta-propiolactone prepared as shown in Example I was suspended in 20 parts of water and 1.58 parts (0.026 mol) of ethanolamine added. The whole was headted at 80–90° C. for 4 hours, the dissolved product concentrated by evaporation of the solvent and dissolved in methanol. By adding ether, 1.56 g. of a polymeric product containing 5.8% by weight of nitrogen. 57.6% by weight of carbon and 8.7% by weight of hydrogen were precipitated, which product decomposed at 180° C. The polymer was soluble in benzene, methanol, glacial acetic acid, dimethyl formamide, dimethyl sulphoxide, pyridine, formic acid and water.

The polymer had utility shown in Example I.

*Example III*

A quantity of 2 parts (0.013 mol) of polymeric 2-(3',4' - dihydropyran - 2'yl) - beta-propiolactone prepared as shown in Example I was heated with a solution of 0.039 mol of ammonia in 25 parts of water for 2 hours at 95° C., the polymer going into solution. After concentration by evaporation of the solvent, the product was dissolved in dimethyl sulphoxide and precipitated with a 1:1 (vol.) mixture of ether and acetone. 1.69 g. of a water-soluble polymer melting at 200–250° C. were obtained.

The polymer had utility as shown in Example I.

Example IV

A quantity of 2 parts (0.013 mol) of a polymeric 2-(3',4' - dihydropyran - 2'yl) - beta-propiolactone prepared as shown in Example I was heated on a water bath with 0.912 part (0.028 mol) of hydrazine and 20 parts of water for 2 hours. The solution was added to a large quantity of methanol, a polymer precipitating. This treatment was repeated, after which 1 part of a polymer was obtained which decomposed at 300° C., was soluble in water and contained 12.5% by weight of nitrogen, 47.5% by weight of carbon and 7.2% by weight of hydrogen.

The polymer had utility as shown in Example I.

Example V

A quantity of 5 parts (0.032 mol) of the polymeric lactone described in Example I was suspended in 70 ml. of a 30% aqueous diethylamine solution. After a short period the polymer was dissolved. After 4 hours heating on a water bath excess diethylamine and water distilled off. The residue (6.75 g.) consisted of a polymer melting at 190–220° C. and soluble in methanol, glacial acetic acid, dimethyl formamide, dimethyl sulphoxide, aniline, pyridine, formic acid and water. It contained 7.1% by weight of nitrogen, 58.2% by weight of carbon and 9.2% by weight of hydrogen.

The polymer had utility as shown in Example I.

Example VI

A quantity of 2 parts (0.013 mol) of the polymeric lactone shown in Example I was suspended in a mixture of 2.42 parts (0.026 mol) of aniline in 20 parts of a mixture of equal volumes of tetrahydrofuran and water and heated at 80° C. for 6 hours, the product having then gone into solution. By adding the solution dropwise to methanol a polymer precipitated which was dissolved in chloroform, precipitated with methanol and dissolved in tetrahydrofuran, 0.81 part of a polymer being subsequently precipitated with ether, which polymer melted at 300° C. and was soluble in tetrahydrofuran, chloroform, dimethylformamide, pyridine, acetonitrile and formic acid. It contained 3.3% by weight of nitrogen, 58.4% by weight of carbon and 7.1% by weight of hydrogen.

Example VII

A quantity of 2 parts (0.013 mol) of the polymeric reaction product prepared in Example I by reacting the polylactone with diethylamine was dissolved in 20 parts of water and 3.2 parts (0.26 mol) of hexamethylene diamine added. This solution was heated at 80–90° C. for 5½ hours, a product precipitating which was removed by suction and washed with dioxane and water. The resulting polymer (3.67 g.) decomposed at 340° C. and was insoluble owing to complete cross-linking. Analysis showed 10.2% by weight of nitrogen, 57.5% by weight of carbon and 9.2% by weight of hydrogen.

Example VIII

A quantity of 2 parts (0.013 mol) of the polymeric reaction produced according to Example I by reaction of the lactone with diethylamine was dissolved in 20 cc. of water together with 3.64 parts (0.026 mol) of urotropin and kept at 80–90° C. for 4½ hours. After aspiration the precipitated polymer was washed with water. 1.3 g. of an insoluble, cross-linked product were obtained which decomposed at 310° C. Analysis showed 5.9% of nitrogen, 49.2% of carbon and 7.4% of hydrogen.

Example IX

Each time a quantity of 0.350 part ($1.67 \cdot 10^{-3}$ mol) of the reaction product prepared according to Example I by reacting the polylactone with diethylamine was dissolved in 1 cc. of water and in each case mixed with 0.1 mol of one of the polyamines listed in the table below. Cross-linking was established by ascertaining the time elapsing between the appearance of turbidity and the formation of an insoluble gel. The results are shown in the following table.

| Polyamine | Quantity (g. $10^{-2}$) | Temperature, °C. | Cross-linking time (min.) |
|---|---|---|---|
| Hexamethylene diamine | 2.030 | 20 | 10 |
| Urotropin | 2.48 | 90–100 | (¹) |
| Ethylenediamine | 1.002 | 20 | 60–120 |
| Do | 1.002 | 90–100 | 10 |
| 2,3-diamino pyridine | 1.82 | 90–100 | 90 |
| 3,4-diamino benzoic acid | 2.54 | 90–100 | (¹) |
| p-Phenylene diamine | 1.57 | 90–100 | 90 |

¹ Slight cross-linking.

Example X

Examples I to VI are repeated with the exception that the polymeric lactone employed is as follows: Copolymer of 2 - (3',4'-dibutyl - 3',4'-dihydro - 2'H-pyran-2'yl)-beta-propiolactone and styrene prepared as above. Related results are obtained.

Example XI

Examples I to IX are repeated with the exception that the polymeric lactone employed is as follows:

2-(3',4'-dibutyl-3',4'-dihydro-2'H-pyran-2'yl)-beta-propiolactone,
2-(3'-chloro-3',4'-dihydro-2'H-pyran-2'yl)-beta-propiolactone,
2-(4'-cyclohexyl-3',4'-dihydro-2'H-pyran-2'yl)beta-propiolactone, and
2-(4'-octyl-3',4'-dihydro-2'H-pyran-2'yl)-beta-propiolactone.

Related results are obtained.

Example XII

Examples I to VI are repeated with the exception that the polymeric lactone employed is a copolymer of 2-(3',4'-dihydro - 2'H-pyran-2'yl) - beta-propiolactone and each of the following monomers: vinyl acetate, acrylonitrile, vinyl chloride, methyl methacrylate, ethyl acrylate, and alpha-methylstyrene. Related results are obtained in each case.

We claim as our invention:
1. A process for the preparation of new polymers which can be cross-linked and have improved solubility in water which comprises reacting in an aqueous medium an addition polymer of an unsaturated heterocyclic substituted lactone of the general formula

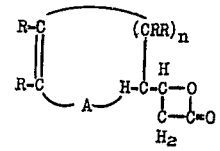

wherein R is a member of the group consisting of hydrogen, halogen and hydrocarbon radicals, A is a member of the group consisting of oxygen, nitrogen and sulfur atoms, and $n$ is 1 to 2, said addition polymer still retaining the lactone groups which were in the original monomer and being formed by the use of an ionic polymerization initiator, and (2) a nitrogen base having a dissociation constant greater than $2.0 \times 10^{-5}$ at a temperature ranging from ambient temperature to about 150° C. and being selected from the group consisting of hydrazine, water-soluble primary and secondary aliphatic monoamines, hexamethylene diamine, ethylene diamine, 2,3-diaminopyridine, 3,4-diaminobenzoic acid, p-phenylene diamine, diethylene triamine and pentamethylenediamine and Urotropin, the amount of the base used being sufficient to react with from 10% to 75% of the lactone groups on the addition polymer.

2. A process as in claim 1 wherein the nitrogen base is a member of the group consisting of hydrazine, ammonia, water-soluble primary and secondary aliphatic monoamines.

3. A process as in claim 1 wherein the polymer of the unsaturated heterocyclic substituted lactone is an addition polymer of 2-(3',4'-dihydro-2'H-pyran-2'yl)-beta-propiolactone, which polymer still retains the lactone groups which were in the original monomer.

4. A process as in claim 1 wherein the polymer is a homopolymer of 2-(3',4'-dihydro-2'H-pyran-2'yl)-beta-propiolactone and the nitrogen base is ammonia.

5. A process as in claim 1 wherein the nitrogen base is diethylamine.

6. A polymeric reaction product of (1) an addition polymer of a substituted lactone of the general formula

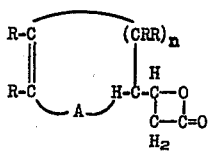

wherein R is a member of the group consisting of hydrogen, halogen and hydrocarbon radicals, A is a member of the group consisting of oxygen, nitrogen and sulfur atoms, and $n$ is 1 to 2, said addition polymer still retaining the lactones present in the original polymer and being formed by the use of ionic polymerization initiators, and (2) a nitrogen base having a dissociation constant greater than $2.0 \times 10^{-5}$ and being selected from the group consisting of hydrazine, ammonia, water-soluble primary and secondary aliphatic monoamines, hexamethylene diamine, ethylene diamine, 2,3-diaminopyridine, 3,4-diaminobenzoic acid, p-phenylene diamine, diethylene triamine and pentamethylenediamine and Urotropin, from 10% to 75% of the lactone groups of the addition polymer being reacted with the nitrogen base.

7. A polymeric reaction product of (1) an addition homopolymer of 2-(3',4'-dihydro-2'H-pyran-2'yl) - beta-propiolactone which still retains the lactone groups which were in the original monomer and which was formed by the use of an ionic polymerization initiator, and (2) ammonia.

8. A cross-linked insoluble polymeric product comprising the reaction product of (1) an addition polymer of 2-(3',4' - dihydro-2'H - pyran-2'yl) - beta-propiolactone which was formed by using an ionic polymerization initiator and which still retains the lactone groups which are in the original monomer and diethylamine, and (2) hexamethylene diamine.

References Cited
UNITED STATES PATENTS

| | | | |
|---|---|---|---|
| 3,116,301 | 12/1963 | Williams et al. | 260—75 |
| 3,161,656 | 12/1964 | Elam | 260—78.3 |

OTHER REFERENCES

Chemical Abstracts, The Naming and Indexing of Chemical Compounds (1962), p. 57N and 58N.

JOSEPH L. SCHOFER, *Primary Examiner.*

H. WONG, *Assistant Examiner.*